(12) United States Patent
Kaufman (10) Patent No.: US 9,494,078 B2
(45) Date of Patent: Nov. 15, 2016

(54) PRIME MOVER WITH RECOVERED ENERGY DRIVEN COMPRESSION OF THE WORKING FLUID

(71) Applicant: Jay Stephen Kaufman, Kingston, NH (US)

(72) Inventor: Jay Stephen Kaufman, Kingston, NH (US)

(*) Notice: Subject to any disclaimer, the term of this patent is extended or adjusted under 35 U.S.C. 154(b) by 0 days.

(21) Appl. No.: 14/972,166

(22) Filed: Dec. 17, 2015

(65) Prior Publication Data

US 2016/0102612 A1    Apr. 14, 2016

Related U.S. Application Data

(63) Continuation-in-part of application No. 13/374,861, filed on Jan. 20, 2012, now abandoned.

(51) Int. Cl.
| F02C 7/08 | (2006.01) |
| F02C 7/10 | (2006.01) |
| F02C 6/20 | (2006.01) |
| F02C 1/04 | (2006.01) |
| F02C 3/34 | (2006.01) |
| F02C 6/16 | (2006.01) |
| F02C 7/18 | (2006.01) |
| F02C 6/18 | (2006.01) |

(52) U.S. Cl.
CPC . *F02C 7/10* (2013.01); *F02C 1/04* (2013.01); *F02C 3/34* (2013.01); *F02C 6/16* (2013.01); *F02C 6/18* (2013.01); *F02C 6/20* (2013.01); *F02C 7/08* (2013.01); *F02C 7/185* (2013.01); *F05D 2250/82* (2013.01); *F05D 2260/601* (2013.01)

(58) Field of Classification Search
CPC .................................. F02C 3/34; F02C 6/16
USPC .................................. 60/301; 180/2.2, 65.31
See application file for complete search history.

(56) References Cited

U.S. PATENT DOCUMENTS

| 3,969,892 | A | * | 7/1976 | Stettler | F02C 3/34 431/116 |
| 3,971,454 | A | * | 7/1976 | Waterbury | B60L 8/003 136/291 |
| 7,497,285 | B1 | * | 3/2009 | Radev | B60K 6/26 180/65.225 |
| 2005/0282097 | A1 | * | 12/2005 | Carrea | F23C 9/006 431/9 |
| 2009/0145130 | A1 | * | 6/2009 | Kaufman | F25J 1/0012 60/722 |
| 2010/0058758 | A1 | * | 3/2010 | Gilchrist, III | F02C 3/34 60/605.2 |

* cited by examiner

*Primary Examiner* — Phutthiwat Wongwian
*Assistant Examiner* — Marc Amar
(74) *Attorney, Agent, or Firm* — Michael Persson; Catherine Napjus; Lawson Persson Weldon-Francke P.C.

(57) ABSTRACT

The present invention is a prime mover with recovered energy driven compression for stationary and motor vehicle application. Efficient low compression operation, especially beneficial to small gas turbines, is enabled with either ambient or cryogenic intake air. Recovered energy, liquefied air cooling and re-liquefaction of air by a cryogenic sink minimize motive fluid compression work of a jet compressor driving exhaust gas recirculation. Regenerative heat exchanger terminal temperature difference relative to turbine temperature drop and heat exchanger surface area are reduced.

18 Claims, 7 Drawing Sheets

PRIME MOVER WITH RECOVERED ENERGY DRIVEN COMPRESSION OF THE WORKING FLUID

CLAIM OF PRIORITY

This application is a continuation in part and claims the benefit of priority of co-pending U.S. patent application Ser. No. 13/374,861, filed on Jan. 20, 2012.

FIELD OF THE INVENTION

The present invention relates to the use of recovered energy to provide minimal compression work in low compression motor vehicle and stationary engines, and in particular to systems for exhaust gas recirculation by a jet compressor driven by motive fluid, which may be compressed by recovered energy, cooled by liquefied air and re-liquefied by a cryogenic sink to minimize motive compression work.

BACKGROUND

A high efficiency prime mover with renewable energy storage has long been a goal of motor vehicle and stationary engine design to provide energy independence, conserve fossil fuels, and reduce emission of combustion products. While the expansion engine of the present invention is applicable to both reciprocating and rotary engines, it is especially beneficial to the gas turbine. The gas turbine offers several advantages over other engines including simplicity, reliability, low maintenance, low emissions, low weight, and ability to burn most any fuel or to run on recovered heat. It has the potential to provide a universal prime mover. It is inefficient in the motor vehicle and stationary distributed electric generation size range, however, especially with respect to variable speed operation. This is because of two factors: First, it has rotor stress limitations imposed by the pressure-speed relationship. The rotor speed is directly proportional to working fluid flow rate and compression ratio, and indirectly proportional to rotor diameter. Second, it has a high heat exchanger terminal temperature difference relative to turbine temperature drop. Both of these factors begin to adversely affect cycle efficiency at a pressure ratio less than about 3. As a result, turn-down is inefficient, exhaust temperature and rotor stresses are high with rotational speeds exceeding 100,000 rpm, and a large expensive heat exchanger is needed.

Previous efforts to adapt a gas turbine to motor vehicle use, notably the Chrysler turbine have been unsuccessful. Present efforts to employ micro-turbines for distributed electric generation are proving successful, but with marginal cost advantage. In general, problems with smaller gas turbine applications are attributable to high compression work with low density ambient intake air and exhaust gas heat recovery with large and complex regenerative heat exchangers. Several cryogenic compression engines have been built and tested to reduce compression work by, in effect, transferring compression to production and storage of liquefied air or nitrogen for compression cooling. Liquefaction work is by renewable energy or other low cost means such as off-peak electricity, therefore not chargeable to cycle efficiency. Both Brayton and Rankine cycles, either fired or with fuel-less ambient heating have been tried.

Consumption of the liquefied coolant has proved to be excessive, however, and high efficiency liquefaction is still sought after. A highly effective regenerative heat exchanger is also sought after. Most gas turbines have a heat exchanger for recovering exhaust heat to improve cycle efficiency. Large surface area and enhanced heat transfer features are combined to attain high effectiveness. Fixed area recuperators constructed of numerous tubes, brazed or welded in complex header arrangements and with enhanced heat transfer are difficult to manufacture and expensive. Another kind of heat exchanger, the rotary regenerator, attains higher effectiveness than recuperators by providing passage of the atmospheric and pressurized flow streams, alternately over the same heat transfer matrix. Seals to minimize leakage between the streams are difficult to maintain and application is limited to low compression systems.

Accordingly, objects of the prime mover of the present invention are to provide:

high cycle efficiency in a low compression prime mover of a transport vehicle drawing ambient atmospheric working fluid, while utilizing recovery of vehicle braking energy and other recoverable energy to reduce compression work of the prime mover;

high cycle efficiency throughout the speed range of a low compression prime mover of a transport vehicle, utilizing recovery of vehicle braking energy and other recoverable energy to drive the engine compressor with injected liquefied air and optionally driving a cryogenic sink for absorbing heat from and re-liquefying the working fluid to reduce compression work of the prime mover;

high cycle efficiency of a low compression prime mover for distributed electric generation, drawing ambient atmospheric working fluid, while utilizing recovery of wind, solar and other recoverable energy to reduce compression work of the prime mover;

high cycle efficiency of a low compression prime mover for distributed electric generation utilizing recovery of wind, solar and other recoverable energy to drive the engine compressor with injected liquefied air and optionally driving a cryogenic sink for absorbing heat from and re-liquefying the working fluid to reduce compression work of the prime mover;

minimal heat transfer surface area of the regenerative heat exchanger of the prime mover of the present invention;

minimal liquefied working fluid consumption of the prime mover of the present invention; and a selection of working fluid and heat sink cryo-coolant combinations for the prime mover of the present invention.

SUMMARY OF THE INVENTION

The present invention is a gas turbine and a vehicle including the gas turbine of the present invention. The inventor's co-pending U.S. patent application Ser. No. 13/374,861 is hereby incorporated by reference.

The gas turbine of the present invention involves the flow, compression, expansion, heating, and cooling of a working fluid. In its most basic form, the gas turbine of the present invention includes a turbine-generator that operates through a flow of working fluid and produces electricity from the operation; an air heater that heats working fluid and provides it to the turbine-generator; a recuperator with a recuperator atmospheric side and a recuperator pressurized side, wherein working fluid flows from the turbine-generator into the recuperator atmospheric side where heat is absorbed from the working fluid before it is vented to atmosphere and working fluid in the recuperator pressurized side absorbs heat from the recuperator atmospheric side and provides it to the air heater; and working fluid compression means for compressing and cooling the working fluid and supplying the compressed working fluid to the air heater.

Preferred embodiments also include a motor-compressor.

In some embodiments, the gas turbine also includes a chiller. In this embodiment, the working fluid compression means are a cryogenic cooling system, which may include a cryogenic sink to re-liquefy evaporated liquid air, a bypass valve, a liquid air dewar, and a liquid air valve. The cryogenic sink includes a cryogenic storage dewar and a slush compressor. In this embodiment of the working fluid compression means, the compressed working fluid is not supplied directly to the air heater or heat source, which may be a combustor, but travels first through the motor-compressor, the chiller, and the recuperator.

In some embodiments, the working fluid compression means are a jet compressor that supplies the compressed working fluid directly to the air heater.

In some embodiments including a jet compressor, the gas turbine also includes a condenser, a motive pump, and an evaporator.

In some embodiments including a jet compressor, the gas turbine also includes a rotary regenerator.

In some embodiments including a jet compressor, the gas turbine also includes a separator.

In some embodiments, the working fluid compression means are both the cryogenic cooling system and the jet compressor.

In its most basic form, the vehicle of the present invention includes a battery that powers the vehicle; wheels connected by axles; a braking generator that converts energy from the vehicle's braking into electricity; and a gas turbine of the present invention. The vehicle preferably also includes an inverter that enables the braking generator to act as an AC motor to directly power the vehicle and as a DC generator to charge the batter. It is preferable that the battery is charged by the turbine generator of the gas turbine when the vehicle is operating but not braking, and by the braking generator when the vehicle is operating and braking.

The prime mover and associated energy recovery systems of the present invention have application in a capacity range of approximately 20 kWe to 150 kWe in which speed of an expansion engine such as a gas turbine is reduced by operation in a compression ratio range of approximately 1.1 to 2.5. Problems and deficiencies of the prior art described above are improved by the present invention. A feature of the prime mover in accordance with the present invention lies in providing a jet compressor to circulate exhaust gas for increasing thermodynamic cycle efficiency in low compression operation while reducing the size and complexity of a regenerative heat exchanger. Another feature of the prime mover in accordance with the present invention lies in providing recovered energy available to a transport vehicle or a distributed electric generator to drive an ambient primary air compressor to offset motive compression work of a jet compressor. Another feature of the prime mover in accordance with the present invention lies in providing recovered energy available to a transport vehicle or a distributed electric generator to reduce motive compression work of a jet compressor by liquefying the motive fluid. Another feature of the prime mover in accordance with the present invention lies in providing a cryogenic sink with a slush compressor driven by recovered energy to provide suction pressure for solidifying a melt cryo-coolant during liquefaction of the working fluid. Another feature of the prime mover in accordance with the present invention lies in providing two parallel working fluid flow paths, a lower pressure primary working fluid path and a motive fluid path to minimize consumption of the liquefied working fluid. Another feature of the prime mover in accordance with the present invention lies in maintaining the melt cryo-coolant of a cryogenic sink between a subliming solid-vapor and a liquid state. Another feature of the prime mover in accordance with the present invention lies in providing on-stream liquefaction of boiled-off working fluid by circulation through the cryogenic sink. Another feature of the prime mover in accordance with the present invention lies in providing partial make-up of the melt cryo-coolant of a cryogenic sink by reliquefaction of vented cryo-coolant in a liquefier powered by recovered energy. Another feature of the prime mover in accordance with the present invention lies in providing make-up of the melt cryo-coolant of a cryogenic sink by dewar exchange. Another feature of the prime mover in accordance with the present invention lies in providing a selection of working fluid and melt cryo-coolant combinations for economizing coolant consumption.

Accordingly, the principal object of the present invention is to provide a prime mover with high cycle efficiency and economic consumption of heat sink coolant and liquefied working fluid in vehicle and stationary application. Still further objects and advantages will become apparent from a consideration of the ensuing description and drawings.

These aspects of the present invention are not meant to be exclusive and other features, aspects, and advantages of the present invention will be readily apparent to those of ordinary skill in the art when read in conjunction with the following description, accompanying drawings, and claims.

DETAILED DESCRIPTION

Figure 1:
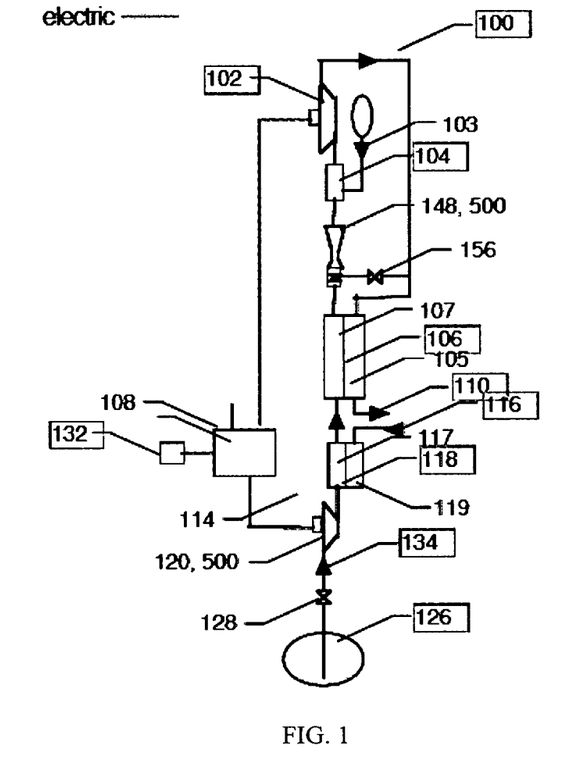
FIG. 1 is a schematic illustrating a preferred embodiment of a gas turbine engine of the present invention with a recovered energy driven compressor with liquefied air injection for compression cooling of the working fluid.

Referring first to FIG. 1, a schematic illustrating a preferred embodiment of a gas turbine 100 of the present invention is provided. Gas turbine 100 circulates a working fluid and creates energy through the various heating, cooling, and compression of the working fluid. The working fluid is preferably air, but may also be nitrogen, nitric oxide, argon, or neon. Gas turbine 100 includes at least turbine-generator 102, air heater 104, recuperator 106, and working fluid compression means 500. Working fluid compression means 500 are means for compressing and cooling the working fluid and supplying the compressed working fluid to air heater 104. Several embodiments of working fluid compression means 500 are identified herein. In some embodiments of working fluid compression means 500, the means supply the compressed working fluid to air heater 104 directly. In other embodiments of working fluid compression means 500, there are intermediary gas turbine features through which the working fluid travels before reaching air heater 104.

Preferred embodiments of gas turbine 100, such as that shown in FIG. 1, also include chiller 118 and motor-compressor 120. In FIG. 1, working fluid compression means 500 is cryogenic cooling system 114 and jet compressor 148. Cryogenic cooling system 114 includes liquid air dewar 126, liquid air valve 128, and coolant 134, which is preferably liquid air. In this embodiment of working fluid compression means 500, the working fluid compressed by cryogenic cooling system 114 does not flow directly into air heater 104, but flows first through chiller 118, recuperator 106, and jet compressor 148. Cryogenic cooling system 114 includes liquid air dewar 126. Liquefied working fluid air for start-up and boil-off replacement is imported to liquid air dewar 126. Liquid air valve 128 is disposed between liquid air dewar 126 and motor-compressor 120 and controls a flow of liquid air 134 from liquid air dewar 126 to motor-compressor 120. As discussed below, a portion of combustion working fluid from chiller atmospheric side 119 is drawn into motor-compressor 120. This combustion working fluid combines with liquid air from liquid air dewar 126 that has travelled through the open liquid air valve 128.

Turbine-generator 102 is fired from air heater 104, which is fueled by fuel 103. Air heater 104 may be any type of heater commonly used in the art, such as a combustor. Air heater 104 is not fueled by fuel 103 in all embodiments of the present invention. Together with recuperator 106, turbine-generator 102 provides electrical power to electrical controller 108 for distribution. Recuperator 106 is an energy recovery heat exchanger that removes heat from the exhaust working fluid. Recuperator 106 has recuperator atmospheric side 105 and recuperator pressurized side 107. Working fluid expelled from turbine-generator 102 flows into recuperator atmospheric side 105. The products of combustion 110 of the working fluid in the air heater 104 continue through recuperator atmospheric side 105 and exhaust to atmosphere. Heat from the exhaust working fluid is absorbed by recuperator pressurized side 107.

Chiller 118 has chiller atmospheric side 119 and chiller pressurized side 117. Atmospheric intake combustion air 116 is drawn into chiller atmospheric side 119 is drawn into motor-compressor 120. Liquid air is mixed into the atmospheric intake air at the motor-compressor intake. The working fluid is compressed by motor-compressor 120 and flows back into chiller pressurized side 117. This compression cools the working fluid and heat generated from the compression is absorbed by the liquid air. Within the chiller working fluid side 117, the working fluid is further cooled when its heat is absorbed by cryogenic intake combustion air 116 in chiller atmospheric side 119. Cold, compressed working fluid then flows into recuperator pressurized side 107. The working fluid in recuperator pressurized side 107 absorbs heat from the heat absorbed by recuperator atmospheric side 105 and begins to expand. The working fluid then flows into jet compressor 148 and then air heater 104 where it is further heated. The resulting expansion of the working fluid operates turbine-generator 102. Working fluid from turbine-generator 102 also flows into jet compressor 148 through valve 156.

Gas turbine 100 may also include an electric generator that provides electricity to storage battery 132. This electric generator may be a vehicle's braking generator 244, as shown in FIG. 2A, or one or more photovoltaic panels.

An open cycle fired system is selected to illustrate design point performance of an 8 kW (10.7 HP) gasoline fired turbine-generator for vehicle or stationary application. Cycle efficiency is 54% at 50,000 rpm with the turbine compression ratio of 1.5; turbine inlet gas temperature of 825° C. (1515° F.); air compressor inlet temperature of −172° C. (−280° F.); and recuperator effectiveness of 95%. Under these conditions fuel consumption is 33 km/L 1.2 kg/hr (2.7 lb/hr); liquefied air consumption is 44 kg/hr (97 lb/hr); and excess air ratio is 24. For comparison, a typical reciprocating engine in the same application has a cycle efficiency of 18% at 5,000 rpm and compression ratio of 10, and efficiency of a typical micro-turbine is 28% at 96,000 rpm with a compression ratio of 3.6.

A small [e.g., 28 kWe (21 HP) peak] recuperated gas turbine, which can be modified to incorporate cryogenic features of the present invention, is available from the Capstone Corporation of Chatsworth, Calif. Cryogenic components including chiller, compressor, and dewar are available from Chart Industries of Garfield Heights, Ohio, Barber-Nichols of Arvada, Colo. and Technifab Products of Brazil, Ind., respectively.

Figure 2A:
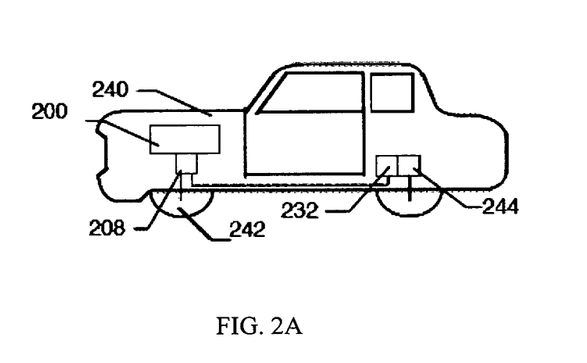
FIG. 2A is a schematic illustrating a transport vehicle powered by a jet compression gas turbine engines of the present invention with recovered energy driven compression.

Now referring to FIG. 2A, a side elevation view illustrating a preferred embodiment of a transport vehicle 240 of the present invention is provided. Vehicle 240 operates by propulsion provided to two motorized wheels 242 an 8 kWe (10.8 HP) jet compression gas turbine 200, which are discussed in detail below with reference to FIG. 2B. An electrical controller 208 distributes recovered energy from a storage battery 232. Storage battery 232 is charged by a braking generator 244 for pressurization of the gas turbines 200. A regenerative braking system, which can be adapted to the vehicle of the present invention, is available from the Ford Motor Company of Dearborn, Mich.

Figure 2B:
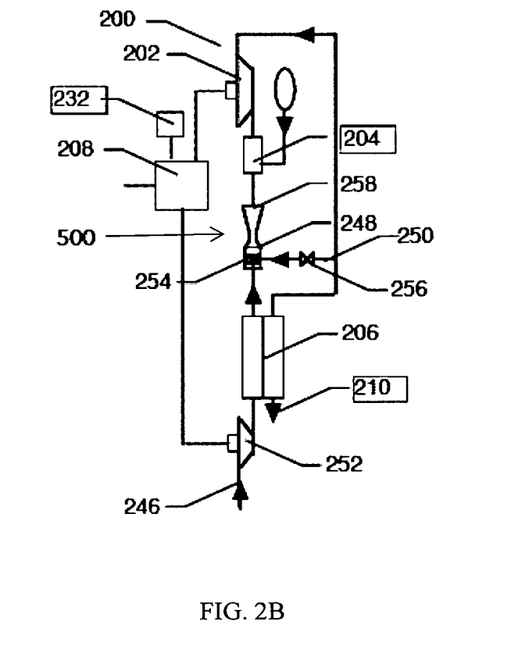
FIG. 2B is a schematic illustrating a preferred embodiment of a jet compression gas turbine engine of the present invention with recovered energy driven compression of ambient atmospheric air.

Now referring to FIG. 2B, a schematic illustrating a preferred embodiment of a gas turbine 200 of the present invention is provided. Regardless of reference number, features with the same name are substantially the same feature throughout the FIGS. In addition, similar features that include reference numbers in some but not all FIGS., should be considered to be substantially similar features. Turbine-generator 202 is fired from a fueled air heater 204. Combined with a recuperator 206, turbine-generator 202 provides electrical power to an electrical controller 208 for distribution. The working fluid of gas turbine 200 consists of a motive combustion air portion 246 that drives a jet compressor 248, a circulated exhaust portion 250 that is entrained into the motive air, and an emission portion 210 that continues to atmosphere through recuperator 206. A motor-compressor 252 provides combustion air through recuperator 206 to a motive nozzle 254 which entrains and circulates exhaust working fluid by suction of high velocity motive fluid from compressor 252 through a sonic nozzle, under control of an exhaust valve 256, for delivery through a discharge nozzle 258 to air heater 204. In the gas turbine 200 shown in FIG. 2B, working fluid compression means 500 is jet compressor 248. In this embodiment of working fluid compression means 500, the compressed working fluid flows directly from jet compressor 248 to air heater 204.

An open cycle fired system is selected to illustrate performance of a gasoline fired gas turbine as prime mover in a compact car operating at an 80 km/hr (50 mph) design point requiring 8 kW (10.7 HP). Compression work, normally provided by turbine-generator output, is supplemented by 33% recovered vehicle braking energy. Cycle efficiency is 44% at 50,000 rpm with motive compression ratio of 5; turbine inlet gas temperature of 825° C. (1515° F.); air compressor inlet temperature of 20° C. (68° F.); and recuperator effectiveness of 95%. Under these conditions fuel economy is 33 km/L (78 mpg) and excess air ratio is 22. High excess air ratio associated with the low turbine pressure ratio obviates the effect of combustion products in the recirculating suction flow. For comparison, a typical reciprocating engine in the same application has a cycle efficiency of 18% at 5,000 rpm and compression ratio of 10, and efficiency of a typical micro-turbine is 28% at 96,000 rpm with a compression ratio of 3.6.

Figure 3:
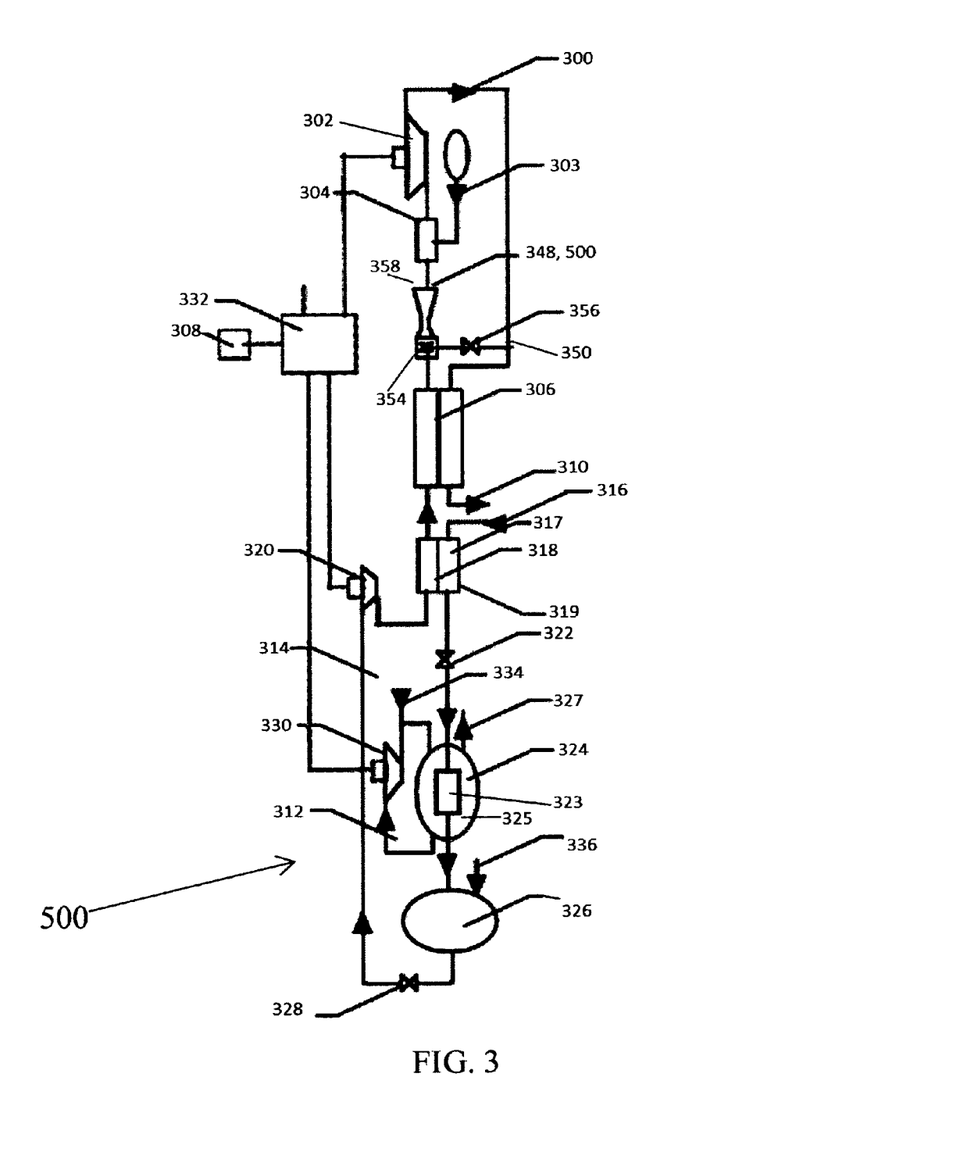
FIG. 3 is a schematic illustrating an alternate preferred embodiment of a jet compression gas turbine engine of the present invention with a recovered energy driven cryogenic sink for re-liquefying evaporated liquid air.

Now referring to FIG. 3, a schematic illustrating an alternate preferred embodiment 300 of gas turbine 200 is provided. This gas turbine 300 may also be used with vehicle 240, shown in FIG. 2A. Like the gas turbine 100 shown in FIG. 1, working fluid compression means 500 include both jet compressor 348 and cryogenic cooling system 314. In this embodiment, however, cryogenic cooling system 314 includes bypass valve 322, cryogenic sink 312, liquid air dewar 326, and liquid air valve 328. Bypass valve 322 is disposed below chiller atmospheric side 118. When bypass valve 322 is closed, all working fluid feeds into motor-compressor 320, as described above. When bypass valve 322 is open, some or all of the working fluid flows into cryogenic storage dewar 324.

Cryogenic sink 312 includes cryogenic storage dewar 324 and slush compressor 330. Cryogenic sink 312 provides liquefaction of the portion of cryogenic intake combustion air 316 drawn in through chiller atmospheric side 318 that comes through bypass valve 322. Cryogenic storage dewar 324 includes dewar working fluid side 323 and shell side 325. As described below, coolant 334 flows through shell side 325 so that working fluid flowing through dewar working fluid side 323 is cooled. In this embodiment, coolant 334 is preferably liquid nitrogen, but may liquid air or other commonly used coolants. Slush compressor 330 circulates the coolant 334, preferably nitrogen slush, through shell side 325. The portion of working fluid that flowed through bypass valve 322 enters dewar working fluid side 323. Condensed, frozen nitrogen 334 therefore enters cryogenic sink 312 and alternately melts in shell side 325 due to heat of absorption from the working fluid flowing through dewar working fluid side 323, and solidifies due to suction pressure of slush compressor 330. Nitrogen vapor is vented through vent 327 out of shell side 325. It is preferred that slush compressor 330 is powered by storage battery 332.

The working fluid is cooled to cryogenic temperature by a cryogenic sink 312 of a cryogenic cooling system 314. The sink 312 is powered by recovered braking energy of vehicle 240. A turbine-generator 302 fired from air heater 304 fueled by fuel 303 with a recuperator 306 provides electrical power to an electrical controller 308 for distribution. The working fluid of gas turbine 300 consists of a combustion air portion 316 following two parallel flow paths, a circulated exhaust portion 350 that is entrained into the motive air, and an emission portion 310 that continues to atmosphere through recuperator 306. The first combustion air path provides primary air from a cryogenic motor-compressor 320, drawing air through the atmospheric side of a chiller 318 and discharging to air heater 304 via recuperator 306. The second path provides motive air, which is drawn through chiller 318 and a bypass valve 322 for liquefaction and storage in a liquid air dewar 326. The liquid is discharged, as required, back through chiller 318 to recuperator 306 and jet compressor 348. A motive nozzle 354 entrains the circulated exhaust into the motive air, under control of an exhaust valve 356, for delivery through a discharge nozzle 358 to air heater 304.

In sink 312, a slush compressor 330 powered by a battery 332, circulates a two phase melt cryo-coolant 334 through the shell side of cryogenic storage dewar 324 wherein entering cryo-coolant alternately melts due to heat absorption and solidifies due to suction pressure of compressor 330. Condensed melt cryo-coolant is imported into the shell side of dewar 324 and liquefied air is imported into liquefied air dewar 326 for boil-off replacement. As described above with reference to other embodiments, gas turbine 300 also includes vent 325 of dewar 324, liquefied fluid air intake 336, and liquid air valve 328.

An open cycle fired system is selected to illustrate performance of a gasoline fired gas turbine as prime mover in a compact car operating at an 80 km/hr (50 mph) design point requiring 8 kW (10.7 HP). Compression work for combustion air is provided by turbine-generator output and cryo-coolant compression work is provided by recovered vehicle braking energy, which is limited to 33% of turbine-generator shaft power. Cycle efficiency is 70% at 46,000 rpm with primary air compression ratio of 1.4; motive compression ratio of 20; turbine inlet gas temperature of 825° C. (1515° F.); air compressor inlet temperature of −172° C. (−280° F.); and recuperator effectiveness of 95%. Under these conditions, fuel economy is 60 km/L (140 mpg); liquefied air consumption is 40 kg/hr (88 lb/hr); and excess air ratio is 27. High excess air ratio associated with the low turbine pressure ratio obviates the effect of combustion products in the recirculating suction flow. For comparison, a typical reciprocating engine in the same application has a cycle efficiency of 18% at 5,000 rpm and compression ratio of 10, and efficiency of a typical micro-turbine is 28% at 96,000 rpm with a compression ratio of 3.6.

The sink is filled with solidified nitrogen coolant and maintained at below the boiling point of −196° C. (−325° F.). Reduction of vapor pressure from 0.7 to 0.1 atmospheres by the slush compressor provides circulation of the melting and solidifying nitrogen. Recovered vehicle braking energy to the slush compressor is 2.4 kW (3.2 HP), equal to 30% of turbine-generator shaft power, while the cryogenic storage dewar provides required working fluid reliquefaction of 35 kg/hr (76 lb/hr). A continuous and sufficient supply of liquefied air is maintained as recovered energy charges the battery to drive the slush compressor. A high temperature jet compressor suitable for exhaust gas recirculation in the present invention is available from the Fox Company of Dover, N.J. Other components to enable features of the present invention are available as discussed with reference to FIG. 1, above.

Figure 4A:
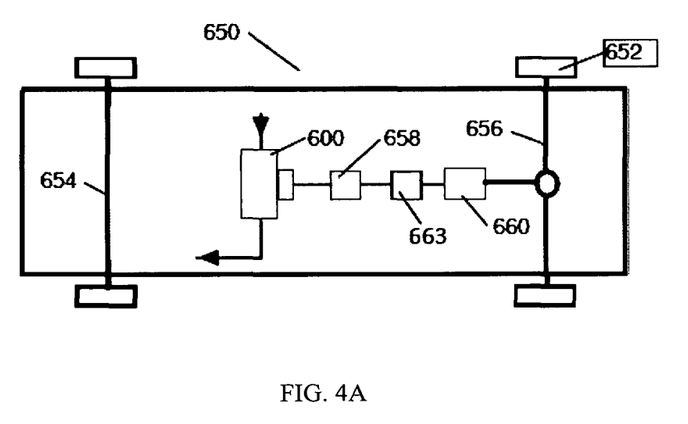
FIGS. 4A and 4B illustrate an alternate preferred embodiment of the gas turbine of the present invention with energy recovery from a motor vehicle.

Now referring to FIG. 4A, a schematic diagram of a chassis 650 of a motor vehicle is provided. The vehicle has typically four wheels 652, a rear axle 654, a front trans-axle 656, and gas turbine 600 of the present invention as prime mover. A battery 658 is charged by a turbine-generator 618 of gas turbine 600 when the vehicle is under power and by a motor-generator 660 during regenerative braking, as required. An inverter 663 enables the motor-generator 660 to act as an AC motor to power the vehicle, and as a DC generator to charge the battery 658.

Figure 4B:
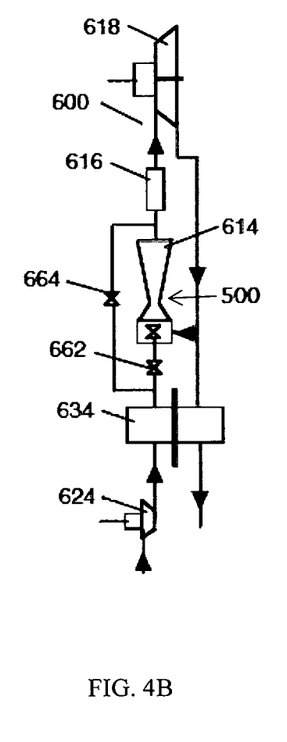

Now referring to FIG. 4B, a schematic illustrating a preferred embodiment of gas turbine 600 based on a Brayton thermodynamic cycle is provided. A motor-compressor 624 powered by battery 658 provides motive pressure of atmospheric air via a motive air valve 662 to a jet compressor 614 for re-circulating a portion of turbine exhaust gas to an air heater 616 while remaining exhaust gas enters a rotary regenerator 634. Rotary regenerator 634 includes a rotating wheel with metallic heat absorbing elements and transfers exhaust heat to pre-heat motive air. A working-fluid bypass valve 664 opens for turbine-generator operation above a selected speed. In this embodiment, working fluid compression means 500 are jet compressor 614.

During operation of the gas turbine of FIGS. 4A and 4B, the compressor requires electrical input of about 50% of turbine output at an average cruising speed of 80 km/hr (50 mph). Regenerative braking at this speed is estimated to provide 65% of required compressor power with the remaining 35% from a charged battery. During infrequent driving situations when regenerative braking is insufficient, there are several supplementary compressor power options, such as those disclosed in U.S. Pat. No. 7,854,278. These include vehicle draft resistance and rolling resistance, estimated to provide 15% and 10% of turbine output, respectively. At higher speeds, recoverable vehicle draft resistance increases exponentially with respect to rolling resistance. At cruising speed, estimated gasoline mileage is 64 km/L (150 mpg) for a vehicle with a curb weight of 1600 kg (3500 lb) and drag coefficient times frontal area of 0.64 $m^2$ (7 $ft^2$). At this speed, the estimated driving range with a 136 kg (300 lb) lithium-ion battery is 485 km (300 mi). For comparison, an electric vehicle requires about (2000 lb) of lithium-ion batteries.

Figure 5A:
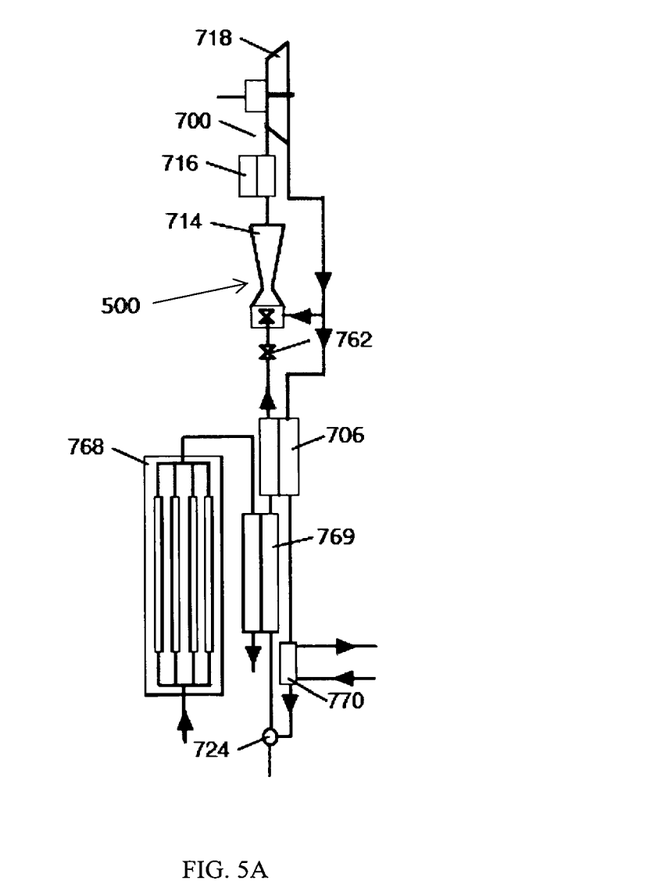
FIGS. 5A and 5B illustrate an alternate preferred embodiment of the gas turbine jet compressor of the present invention with a liquid motive fluid.

Now referring to FIG. 5A, a schematic diagram illustrating an alternate preferred embodiment of a gas turbine 700 based on a Rankine thermodynamic cycle is provided. A pump 724 provides motive pressure of motive fluid via a motive fluid valve 762 to a jet compressor 714 for circulation of the working fluid. Motive fluid from pump 724 is pre-heated by radiation from solar panel 768 in a solar heated evaporator 769 and further heated by exhaust working fluid in recuperator 706, before recombining with suction fluid in jet compressor 714. The exhaust working fluid is then liquefied in a water-cooled condenser 770 and returned to the inlet of pump 724. Air heater 716 is a heater in this embodiment. As with all embodiments, gas turbine 700 also includes turbine-generator 718.

Figure 5B:
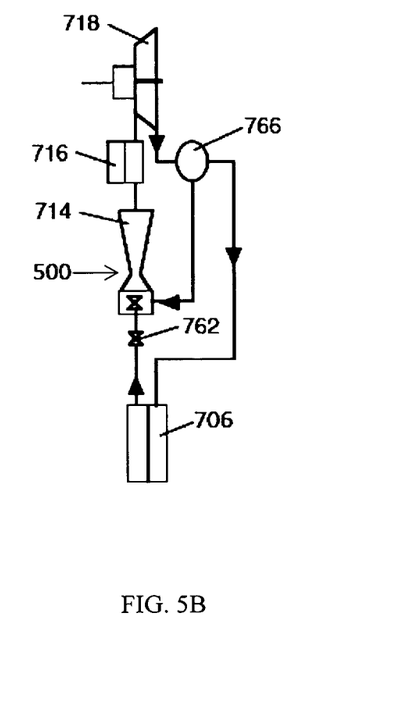

Now referring to FIG. 5B, a schematic diagram illustrating an alternate embodiment of the gas turbine of FIG. 5A is provided. In this embodiment, the working fluid consists of separate motive fluid and suction fluid components to reduce the motive fluid flow requirement. A separator 766 receives turbine exhaust working fluid and discharges the motive fluid portion to a recuperator 706 for heat recovery to pressurized motive fluid while the working fluid portion is circulated via suction of jet compressor 714 to a heater 716. A gas turbine (micro-turbine) suitable for conversion to independent electric powered compression is available from Capstone Turbine Corp. of Chatsworth, Calif. A vacuum tube solar heater suitable for evaporating motive fluid is available from Apricus North America of Los Angeles, Calif. In the embodiments shown in FIGS. 5A and 5B, working fluid compression means 500 are jet compressor 714.

Operating performance of the gas turbine of FIG. 5A, with water/steam as motive and suction components of the working fluid, is exemplified by output of 30 kWh during 8 hours of overcast atmospheric conditions. Turbine conditions are 3.7 kW (5.0 HP) at 100,000 rpm, inlet gas temperature 850 C (1560 F), and 5 recuperator effectiveness 90%. High pressure of the liquid motive fluid requires a recuperator rather than rotary regenerator, which would be pressure limited due to leakage. The ratio of suction to motive mass flow may be increased by adjustment of motive fluid temperature and molecular weight relative to the suction fluid. This ratio is proportional to the square root of motive fluid temperature to suction fluid temperature, and of the square root of suction fluid molecular weight to motive fluid molecular weight. Performance results for the configuration shown in FIG. 5A are: solar panel area=28 $m^2$ (300 $ft^2$); pressure ratio=1.3; ratio of suction fluid to motive fluid=5; thermal efficiency=13%; and fuel efficiency (not including solar)=65%. In the configuration shown in FIG. 6B, a change of suction fluid to helium improves performance results as follows: solar panel area=12 $m^2$ (125 $ft^2$); pressure ratio=1.1; ratio of suction fluid to motive fluid=4; thermal efficiency=25%; and fuel efficiency (not including solar)=70%.

Accordingly, it is shown that the recovered energy driven compression engine of this invention improves cycle thermal efficiency in both motor vehicle and stationary applications. In particular, it overcomes problems of the gas turbine in small low pressure applications.

Although the description above contains many specific details, these should not be construed as limiting the scope of the invention but as merely providing illustration of some of the preferred embodiments of this invention. For example, turbines, either radial or axial types having either electrical or mechanical output, can be connected in series to lower expansion ratio and speed, or connected in parallel to increase power. In addition, the motive compressor, motive pump, primary compressor, and liquefier may be powered by recovered energy of vehicle braking or draft loss, as well as by solar radiation and wind. The heating source may be solar radiation as well as combustion in either open or closed working fluid systems. The cryogenic sink may absorb compression heat from within the compressor and from the compressor outlet, as well as absorbing heat from the working fluid at the compressor inlet. Thus the scope of the invention should be determined by the appended claims and their legal equivalents, rather than by the examples given.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

The invention claimed is:

1. A gas turbine comprising:
   a turbine-generator that is operated by a flow of working fluid;
   an air heater that heats the working fluid and is in fluid communication with said turbine-generator such that the heated working fluid from said air heater flows into said turbine-generator;
   a recuperator comprising a recuperator atmospheric side and a recuperator pressurized side, wherein:
   said recuperator atmospheric side is in fluid communication with said turbine-generator such that:
   at least a portion of working fluid that operates and is expelled by said turbine-geneialor flows into said recuperator atmospheric side;
   said recuperator atmospheric side absorbs heat from the working fluid; and
   said recuperator atmospheric side exhausts combustion products of the working fluid to atmosphere;
   said recuperator pressurized side is in fluid communication with said air heater such that working fluid from said recuperator pressurized side flows into said air heater, wherein the working fluid that flows through said recuperator pressurized side is heated by the heat absorbed by said recuperator atmospheric side;

a motor-compressor in fluid communication with said recuperator such that working fluid from said motor-compressor flows into said recuperator pressurized side;

a chiller comprising a chiller atmospheric side and a chiller pressurized side, wherein:
  atmospheric intake combustion air is drawn into said chiller through said chiller atmospheric side;
  said chiller pressurized side is in fluid communication with said recuperator pressurized side such that working fluid from said chiller pressurized side flows into said recuperator pressurized side; and
  said motor-compressor is in fluid communication with said chiller such that working fluid flowing out of said chiller atmospheric side flows into said motor-compressor and compressed working fluid flowing out of said motor-compressor flows into said chiller pressurized side; and working fluid compression means for compressing and cooling the working fluid and supplying compressed working fluid to said air heater, wherein said working fluid means comprise a jet compressor and a cryogenic cooling system, wherein:

said jet compressor is:
  disposed between said recuperator and said air heater;
  in fluid communication with said recuperator such that working fluid flowing out of said recuperator pressurized side flows into said jet compressor;
  in fluid communication with said air heater such that compressed working fluid flowing out of said jet compressor flows into said air heater; and
  in fluid communication with said turbine-generator such that at least a portion of working fluid expelled from said turbine-generator flows into said jet compressor; and said cryogenic cooling system comprises:
  a liquid air dewar that stores liquid air in fluid communication with said motor-compressor such that working fluid flows from said liquid air dewar to said motor-compressor; and
  a liquid air valve disposed between said liquid air dewar and said motor-compressor, wherein said liquid air valve controls flow the liquid air from said liquid air dewar to said motor-compressor;
  wherein said cryogenic cooling system supplies compressed working fluid to said air heater through motor-compressor, said chiller pressurized side, and said recuperator pressurized side;

an exhaust valve disposed between said turbine-generator and said jet compressor, wherein:
  when said exhaust valve is closed, all of the working fluid expelled from said turbine-generator flows to said recuperator atmospheric side; and
  when said exhaust valve is open, at least some of the working fluid expelled from said turbine-generator flows into said jet compressor.

2. The gas turbine as claimed in claim 1, wherein said jet compressor comprises a motive nozzle through which working fluid enters said jet compressor and a discharge nozzle out of which working fluid leaves said jet compressor.

3. The gas turbine as claimed in claim 2, wherein said motive nozzle entrains the working fluid allowed through said exhaust valve into said jet compressor.

4. The gas turbine as claimed in claim 1, further comprising a controller to which electrical power is provided by said turbine-generator.

5. The gas turbine as claimed in claim 4, further comprising a storage battery in electrical communication with said controller such that electricity provided to said controller is stored in said storage battery, wherein said storage battery provides power to at least said motor-compressor.

6. The gas turbine as claimed in claim 5, further comprising an electric generator that provides power to said storage battery, wherein said electric generator is at least one photovoltaic panel.

7. The gas turbine as claimed in claim 1, further comprising a fuel source in communication with said air heater such that said fuel source provides said air heater with fuel.

8. The gas turbine as claimed in claim 1, wherein at least said motor-compressor is powered by recovered energy from one of a group consisting of vehicle motion, solar radiation, and wind.

9. The gas turbine as claimed in claim 1, wherein the working fluid is one of a group consisting of air, nitrogen, nitric oxide, argon, neon, and a mixture of two or more of air, nitrogen, nitric oxide, argon, and neon.

10. A gas turbine comprising:
  a turbine-generator that is operated by a flow of working fluid;
  an air heater that heats the working fluid and is in fluid communication with said turbine-generator such that the heated working fluid from said air heater flows into said turbine-generator;
  a recuperator comprising a recuperator atmospheric side and a recuperator pressurized side, wherein:
    said recuperator atmospheric side is in fluid communication with said turbine-generator such that:
      at least a portion of working fluid that operates and is expelled by said turbine-generator flows into said recuperator atmospheric side;
      said recuperator atmospheric side absorbs heat from the working fluid; and
      said recuperator atmospheric side exhausts combustion products of the working fluid to atmosphere;
    said recuperator pressurized side is in fluid communication with said air heater such that working fluid from said recuperator pressurized side flows into said air heater, wherein the working fluid that flows through said recuperator pressurized side is heated by the heat absorbed by said recuperator atmospheric side;
  a motor-compressor in fluid communication with said recuperator such that working fluid from said motor-compressor flows into said recuperator pressurized side;
  working fluid compression means for compressing and cooling the working fluid and supplying compressed working fluid to said air heater, wherein said working fluid means comprise a jet compressor and a cryogenic cooling system;
  said cryogenic cooling system comprising:
    a cryogenic sink comprising:
      a cryogenic storage dewar comprising a shell side and a dewar working fluid side, wherein said shell side and said dewar working fluid side are fluidly separated from one another; and
      a slush compressor that circulates a coolant through said shell side of said cryogenic storage dewar;
    a bypass valve disposed between said chiller atmospheric side and said dewar working fluid side, wherein said bypass valve controls flow of the working fluid between said chiller atmospheric side and said dewar working fluid side;
a liquid air dewar that stores liquid air in fluid communication with said dewar working fluid side such that working fluid flows from said dewar working fluid side into said liquid air dewar; and
a liquid air valve disposed between said liquid air dewar and said motor-compressor, wherein said liquid air valve controls flow of a combination of the working fluid and liquid air from said liquid air dewar to said motor-compressor;
wherein said cryogenic cooling system supplies compressed working fluid to said air heater through said motor-compressor, said chiller pressurized side, and said recuperator pressurized side;
wherein:
said jet compressor is disposed between said recuperator and said air heater;
said jet compressor is in fluid communication with said recuperator such that working fluid flowing out of said recuperator pressurized side flows into said jet compressor;
said jet compressor is in fluid communication with said air heater such that compressed working fluid flowing out of said jet compressor flows into said air heater; and
said jet compressor is in fluid communication with said turbine-generator such that at least a portion of working fluid expelled from said turbine-generator flows into said jet compressor.

11. The gas turbine as claimed in claim 10, wherein the coolant circulating through said cryogenic sink is liquid nitrogen.

12. The gas turbine as claimed in claim 10, wherein at least said motor-compressor is powered by recovered energy from one of a group consisting of vehicle motion, solar radiation, and wind.

13. A gas turbine comprising:
a turbine-generator that is operated by a flow of working fluid; an air heater that heats the working fluid and is in fluid communication with said turbine-generator such that the heated working fluid from said air heater flows into said turbine-generator;
a motor-compressor;
a jet compressor comprising an ejector that compresses the working fluid and supplies compressed working fluid to said air heater, wherein said jet compressor is in fluid communication with: said air heater such that compressed working fluid flowing out of said jet compressor flows into said air heater; and
said turbine-generator such that at least a portion of working fluid expelled from said turbine-generator flows into said jet compressor; a motive air valve, a bypass valve, and a rotary regenerator, wherein said jet compressor is disposed between said rotary generator and said air heater and wherein said rotary regenerator is in fluid communication with:
said turbine-generator, such that at least a portion of the working fluid expelled from said turbine-generator enters said rotary regenerator;
said motor-compressor, such that compressed working fluid from said motor-compressor flows into said rotary regenerator;
said jet compressor, such that when said motive air valve is open, at least a portion of working fluid flows from said rotary regenerator to said jet compressor; and said air heater, such that when said bypass valve is open, at least a portion of working fluid flows from said rotary regenerator to said air heater.

14. The gas turbine as claimed in claim 13, wherein at least said motor-compressor is powered by recovered energy from one of a group consisting of vehicle motion, solar radiation, and wind.

15. A gas turbine comprising:
a turbine-generator that is operated by a flow of working fluid; an air heater that heats the working fluid and is in fluid communication with said turbine-generator such that the heated working fluid from said air heater flows into said turbine-generator;
a recuperator comprising a recuperator atmospheric side and a recuperator pressurized side, wherein:
said recuperator atmospheric side is in fluid communication with said turbine-generator such that:
at least a portion of working fluid that operates and is expelled by said turbine-generator flows into said recuperator atmospheric side;
said recuperator atmospheric side absorbs heat from the working fluid; and said recuperator atmospheric side exhausts combustion products of the working fluid to atmosphere;
said recuperator pressurized side is in fluid communication with said air heater such that working fluid from said recuperator pressurized side flows into said air heater,
wherein the working fluid that flows through said recuperator pressurized side is heated by the heat absorbed by said recuperator atmospheric side;
a motive fluid valve;
a jet compressor comprising an ejector that compresses the working fluid and supplies compressed working fluid to said air heater, wherein said jet compressor is:
disposed between said recuperator and said air heater;
in fluid communication with said recuperator such that working fluid flowing out of said recuperator pressurized side flows into said jet compressor;
in fluid communication with said air heater such that compressed working fluid flowing out of said jet compressor flows into said air heater;
in fluid communication with said turbine-generator such that at least a portion of working fluid expelled from said turbine-generator flows into said jet compressor; and
said motive fluid valve is disposed between said recuperator pressurized side and said jet compressor and controls a flow of working fluid from said recuperator pressurized side to said jet compressor.

16. The gas turbine as claimed in claim 15, further comprising a separator in fluid communication with:
said turbine generator, such that working fluid expelled from said turbine generator flows into said separator;
said recuperator, such that at least a portion of working fluid flows from said separator to said recuperator atmospheric side; and
said jet compressor, such that at least a portion of working fluid flows from said separator to said jet compressor.

17. The gas turbine as claimed in claim 15, further comprising:
a condenser in fluid communication with said recuperator, such that working fluid from said recuperator atmospheric side flows into said condenser and liquefied;
an evaporator, wherein:
said evaporator heats working fluid that flows through said evaporator; and said evaporator is in fluid communication with said recuperator, such that heated working fluid flows from said evaporator into said recuperator pressurized side; and a motive pump in fluid communication with said condenser, such that liquefied working fluid flows from said condenser into said motive pump, and with said evaporator, such that liquefied working fluid flows from said motive to said evaporator, wherein said motive pump discharges liquefied working fluid through said evaporator, said recuperator, said motive fluid valve, and said jet compressor.

18. The gas turbine as claimed in claim 15, wherein at least said motor-compressor is powered by recovered energy from one of a group consisting of vehicle motion, solar radiation, and wind.

* * * * *